June 7, 1960
A. R. KANAGA
2,939,383
COOKING DEVICE
Filed Oct. 7, 1957
4 Sheets-Sheet 2
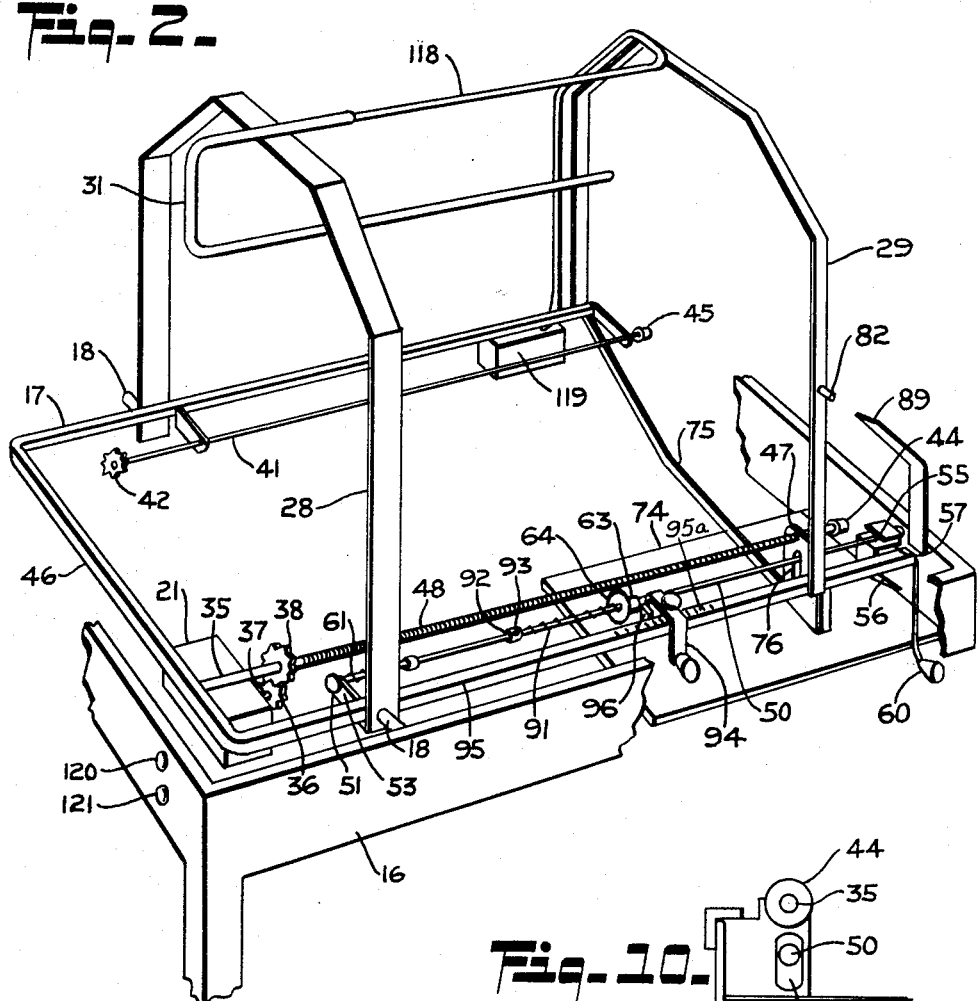
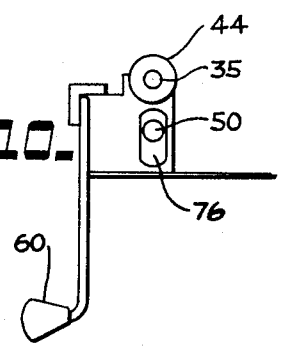
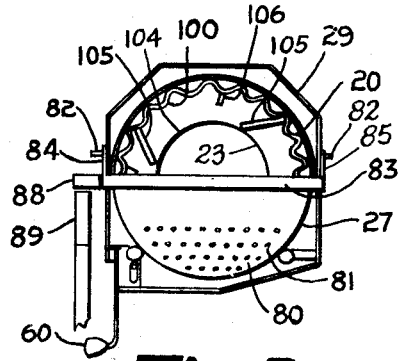
INVENTOR
AMOS R. KANAGA
BY
ATTORNEY June 7, 1960 A. R. KANAGA 2,939,383
COOKING DEVICE
Filed Oct. 7, 1957 4 Sheets-Sheet 3
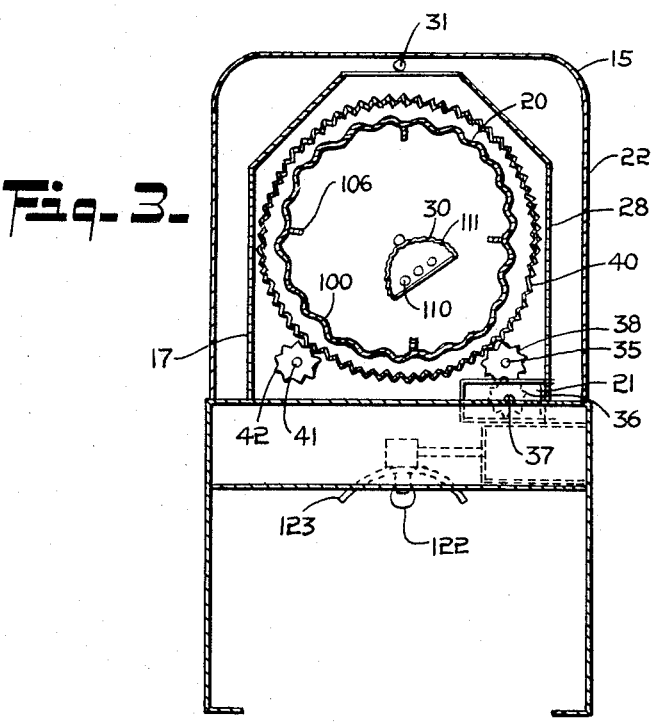
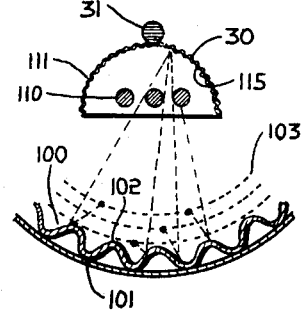
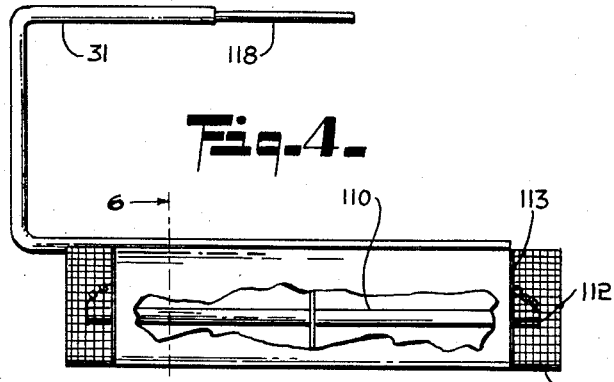
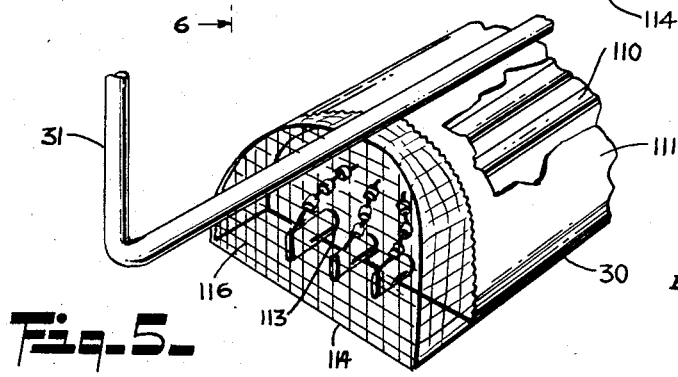
INVENTOR
AMOS R. KANAGA
BY
ATTORNEY

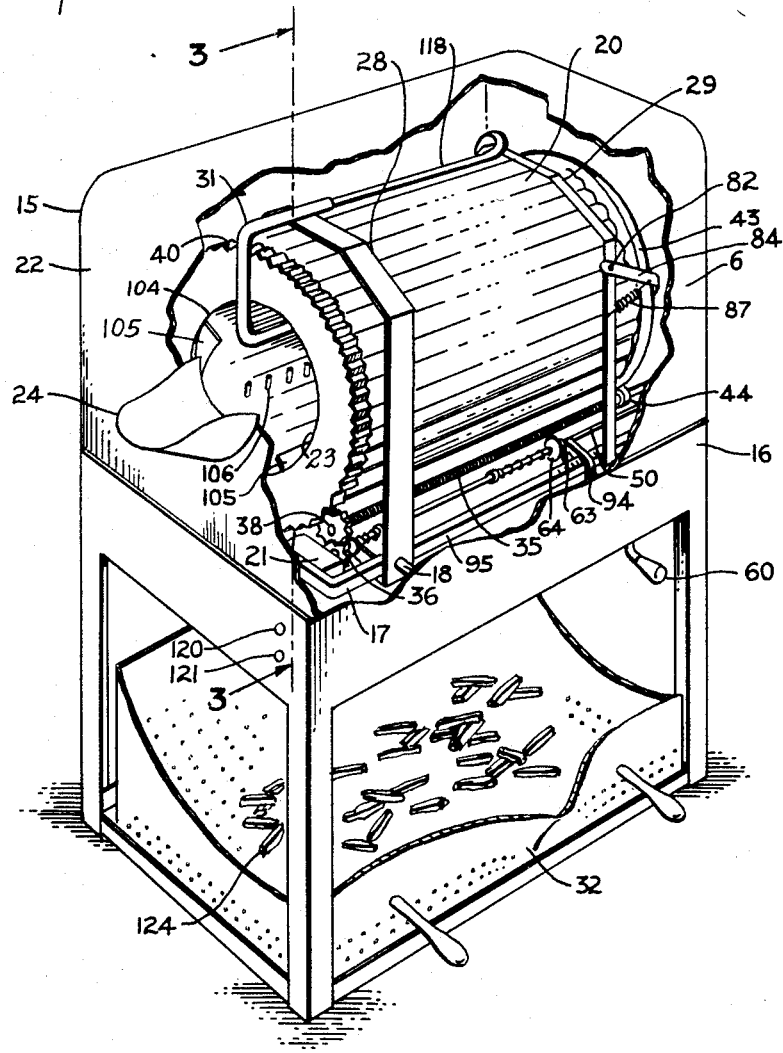

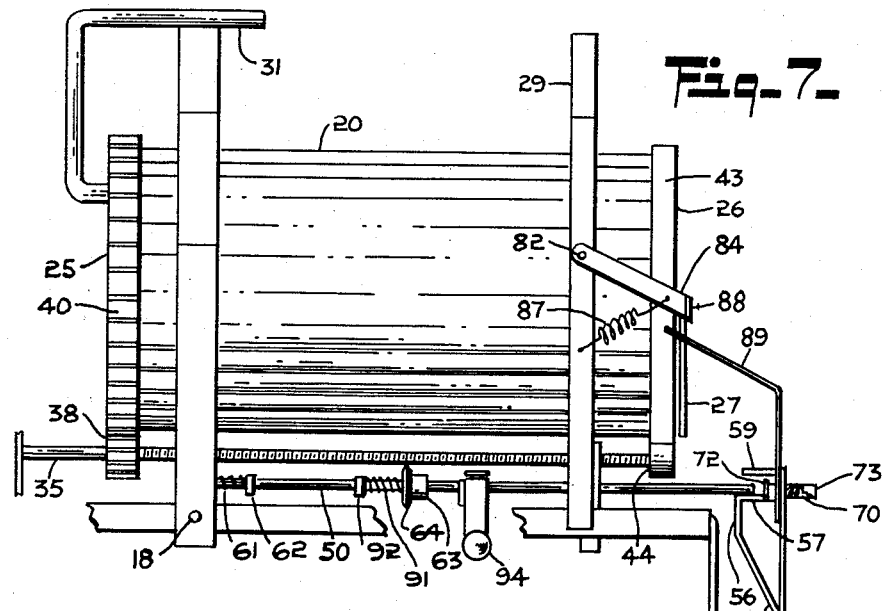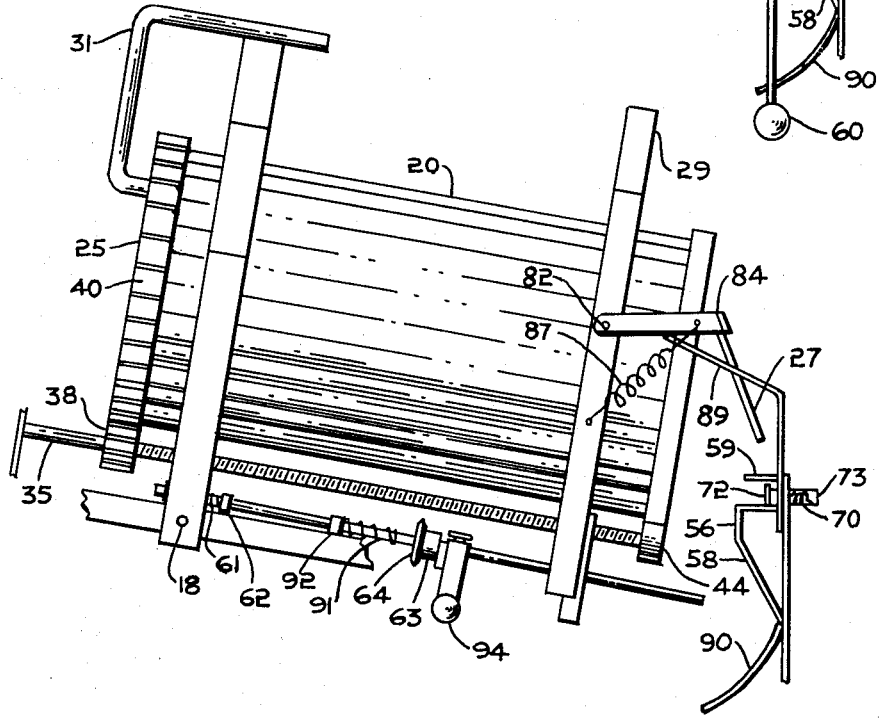

United States Patent Office 2,939,383
Patented June 7, 1960

2,939,383
COOKING DEVICE

Amos R. Kanaga, San Mateo, Calif., assignor to Fryonic Corp., San Francisco, Calif., a corporation of Nevada Filed Oct. 7, 1957, Ser. No. 688,592

20 Claims. (Cl. 99—327)

This invention relates to improvements in food cooking and warming devices. More particularly, it relates to an automatic cooker which uses radiant heat to cook or heat food products. It may be used for frying, baking, and roasting.

This is a continuation-in-part of patent application Serial No. 615,635, filed October 12, 1956, now abandoned, entitled Automatic Food Cooker and Warmer.

One object of this invention is to provide a cooking unit for use in restaurants and capable of foolproof, substantially automatic operation. In my device all that has to be done, once the device is properly adjusted, is to put food into it, and it will cook the food for the proper time and then unload it into a serving tray.

Another object of the invention is to provide a cooker requiring no special vents, so that it does not have to be used in the kitchen below special hoods but may be used in the main portion of the restaurant. Achievement of this object is possible because my device employs electric radiant heat and is practically smokeless and odorless and is self-ventilating to the extent necessary.

Another object of the invention is to encourage restaurant sales of the cooked product by presenting an attractive display of the cooked product out where the diners can see it, while the less-attractive operating portions of the device are obscured by an attractive hood.

Another object of the invention is to provide a cooking device that is easy to keep clean and to take apart for more thorough cleaning from time to time.

My invention also saves the time of the cook and waiter by being automatic and by assuring the proper cooking time without careful attendance.

Another object of my invention is to provide a type of device for heating and completing the cooking of partially cooked food, such as French fried potatoes, which have been between 30% and 80% precooked in deep fat. An important feature of my invention is that, while it completes the cooking of these French fried potatoes, it removes substantially all the grease from them; no grease need be added, that already on the frozen precooked potatoes being adequate. Thereby, the invention produces a better-tasting, less greasy food product and also the cooking device is more easily kept clean.

A very important object of my invention is to employ electrically generated heat waves in a most efficient manner, focusing some heat rays and dispersing others to achieve a more rapid and more even cooking operation. This is done by combining a novel optical type of reflector system with the radiant heat-producing elements.

Another important feature of my invention is to increase the economy of operation of electric food cooking devices by having the heating elements turned off except during actual cooking while at the same time the heat comes on practically instantly when it is desired to cook the food. Thus my device uses electricity only during the relatively short cooking and warming period, but uses it very efficiently during that period. This is done partly because the heat waves do not disperse aimlessly as in most such devices but are focused so that almost all the heat produced is actually used.

Another object of the invention is to provide a warming means that keeps the food warm after it has been cooked until it is served and does this with much less tendency to dry out the food than was heretofore possible. My device accomplishes this object by providing a warming lamp together with a reflector that spreads the warming rays over the entire area and apparently makes use of radiant energy of frequencies which have less tendency to dry out the spectrum than is usual.

Other objects and advantages will appear from the following description of a preferred embodiment of my device presented in accordance with 35 U.S.C. 112.

In the drawings:

Fig. 1 is a view in perspective of a cooking device embodying the principles of my invention, with a portion of the cabinet housing broken away to show interior portions.

Fig. 2 is an enlarged perspective view of the frame of the device of Fig. 1, with only a portion of the base shown, the remainder being broken away.

Fig. 3 is a view in end elevation of the whole device, with the upper portion shown in section taken along the line 3—3 in Fig. 1.

Fig. 4 is an enlarged view in side elevation of the novel heater unit shown in Fig. 3.

Fig. 5 is a fragmentary view in perspective of one end of the heater unit, further enlarged as compared with Fig. 4.

Fig. 6 is a fragmentary view in section taken along the line 6—6 in Fig. 4 and also showing a portion of the cooking drum with additional diagrammatic indications of the paths of some of the heat rays.

Fig. 7 is a view in side elevation of the rotating cooking drum and some of its associated driving, supporting, and unloading elements, shown in the horizontal or cooking position.

Fig. 8 is a view similar to Fig. 7, showing the drum and its associated elements in the tilted or unloading position.

Fig. 9 is a view in end elevation of the gate end of the cooking drum and its associated parts.

Fig. 10 is an enlarged detail view in end elevation of the lost-motion connection between the drive shaft and the frame-supporting rod, and the handle that raises the frame from the tilted to the horizontal position.

General description

A cooking device 15 embodying the principles of my invention preferably has a supporting base 16 which may resemble a table without a top. A tiltable frame 17 is rotatably supported with respect to the base 16 by pivot means 18, so that the frame 17 and all the elements which it supports can be tilted from a normally horizontal position (Figs. 1, 2 and 7) to an inclined position (see Fig. 8), in a manner to be explained later.

The cooking is done in a generally cylindrical drum 20 which is mounted to tilt with the frame 17, and is rotated relatively to the frame 17 by suitable drive means including an electric motor 21. The drum 20, the supporting frame 17, and other working parts are normally covered by a hood or cabinet housing 22 which rests on the base 16 and is provided at one end with an opening 23 and a hopper 24, through which uncooked food is introduced into an open end 25 of the cooking drum 20. The lower half of the opposite end 26 of the drum 20 is normally closed by a gate 27, while most of the upper half of the end 26 is always open as an aid to heat dissipation.

The frame 17 includes two generally U-shaped arches 28 and 29, one adjacent each end of the drum 20. The arch 28 at the open end 25 of the drum 20 supports a novel heater unit 30 inside the cooking drum 20, as by means of a generally U-shaped bracket 31. This heater unit 30 supplies the heat that cooks the food in the drum 20 as the drum rotates. Preferably, radiant heat is employed in a novel structure which will be explained below, after further explanation of the mechanism for rotating the drum 20 and tilting the frame 17.

The arch 29 adjacent the gate end 26 is used to support the gate 27, so that the gate 27 remains stationary while the drum 20 rotates. When the food has been cooked, the drum 20 and its supporting frame 17 are tilted and the gate 27 is opened so that the cooked food is unloaded into a tray 32 below, from which it may be served.

Rotation of the drum 20

As explained earlier, the drum 20 is rotated during cooking. The purpose is to constantly turn the food over so that it will be evenly cooked. If there is no rotation, the food tends to burn or to cook unevenly. There are several ways in which this rotation may be accomplished, one preferable form being shown in the drawings, in which the frame 17 rotatably supports a drive-shaft 35 driven by the motor 21. While drive belts or chains or direct drive or other similar apparatus may be used, I prefer to drive the shaft 35 by means of a drive-gear 36 secured to the motor shaft 37 and engaging a spur-gear 38 attached to the drive shaft 35.

The peripheral rim of one end (the end 25, for example) of the drum 20 may be provided with a large gear 40 which is driven by the spur-gear 38. An idling shaft 41 may be mounted rotatably in the frame 17 parallel to the drive shaft 35 ad be provided with an idling gear 42 also engaging the drum gear 40. While the gate end 26 of the drum 20 may also be geared and driven by spur gears, if desired, I prefer to have a smooth peripheral rim 43 at that end that rests on a pair of rollers 44 and 45, one on the drive shaft 35 and another on the idling shaft 41. Thus, rotation of the motor drive shaft 37 acts through the spur-gear 38 to drive the large gear 40 and therefore to rotate the drum 20.

Support of the frame 17 (Fig. 2)

The drive shaft 35 may be rotatably mounted between a frame cross member 46 and a bracket 47 that is rigidly secured to the frame 17. For automatic use the drive shaft 35 may be provided with screw threads 48.

Below the drive shaft 35 and normally parallel to it is a frame support rod 50. One end 51 of the rod 50 is loosely mounted for reciprocation through an oversize opening in a bracket 53. The rod 50 may have its end 51 oversize, as shown, or may have a cotter pin extend therethrough to keep it from falling out of the bracket 53. The other end 55 of the rod 50 is adapted for engagement and disengagement with a supporting bracket 56 that is rigidly attached to the base 16. As shown in Figs. 7 and 8, the bracket 56 has a shelf-like catch portion 57 and a depending guide cam portion 58 which slopes in toward the base 16 from the outer end of the catch 57. The bracket 56 may also have a stop portion 59 above and parallel to the catch 57 to limit upward movement of the rod 50.

When the frame 17 is in its tilted position (see Fig. 8), it may be lifted by a handle 60 (Figs. 1, 2 and 10) adjacent the same end as the catch 57. Then the end 55 of the frame support rod 50 rides up the guide cam 58 toward the catch 57. This moves the rod 50 lengthwise (to the left in Figs. 2 and 8), the end 51 being pushed further beyond the bracket 53. When the end 55 reaches the top of the guide cam 58, a spring 61, which is compressed between a collar 62 and the bracket 53, pushes the rod 50 in the opposite direction (to the right in Figs. 2 and 7), forcing the end 55 along above the catch 57, so that the rod 50 is thereby locked in a horizontal position.

A collar 63 is mounted loosely on the frame support rod 50 so that it can move freely therealong, and it is provided with a knife-edge follower flange 64. When the rod 50 is horizontal, the follower flange 64 engages the threads 48 on the drive shaft 35 and provides another support point for the frame 17. Thus, the frame 17 is supported at one end by the pivot means 18 (which may be a single shaft or two stub shafts, as shown, and may be rotatably mounted with respect to either the frame 17 or the base 16) and is normally supported at the other end in its horizontal position by the combination of the catch 57 on the base 16, the rod 50, the flanged collar 63, the threaded shaft 35, the bracket 47 and the frame members 46 and 95 to which the bracket 47 and shaft 35 are mounted.

Manual tilting

The frame 17 may be moved manually to its tilted position. For this purpose a spring-loaded push button 70 is mounted reciprocatingly in the base 16 at the bracket 56 so that its inner end 71 extends between the catch 57 and the stop flange 59. The inner end 71 may be provided with a flanged pusher plate 72 to insure engagement with the rod end 55. A spring 73 urges the button 70 to a normally outer position where it does not interfere with the locking of the rod 50 in the catch 57. When the frame 17 is to be tilted, the button 70 is pushed in to force the spring-loaded rod 50 out of the catch 57.

Once the rod end 55 is disengaged from the catch 57, the weight of the frame 17 and the members it supports causes the unsupported end to drop, the frame 17 swinging about the pivot means 18, until a stop is engaged. The stop may be a section 74 of the base 16, and it may be engaged by a frame member 75 (Fig. 2).

The rod 50 extends through a vertically elongated slot 76 in the bracket 47 (see Fig. 10); so when the frame 17 is stopped by engagement of the members 74 and 75, the outboard end of the rod 50 drops a little further, until it engages the bottom of the slot 76. This lost-motion connection permits disengagement of the flange follower 64 from the threaded drive shaft 35.

Operation of the gate 27

The gate 27 may comprise a semi-circular disc or plate 80 (Fig. 9) preferably perforated by ventilating openings 81, too small to allow food to escape. The gate 27 is pivotally mounted on a pair of studs 82 on the arch 29 by means of a gate frame 83 whose arms 84 and 85 (see Fig. 6) are provided with suitable sockets or openings to engage the studs 82. Preferably the arms 84 and 85 lie at 90° with respect to the plane of the plate 80 and are also inclined with respect to the horizontal. A tension spring 87 may extend between the arm 84 and the arch 29, urging the gate 27 to a normally closed position.

The gate 27 is opened when the frame 17 drops. Then, a trip member 88 rigidly secured to the arm 84 engages a cam 89 rigidly secured to the base 16. As the member 88 rides down the cam 89, the plate 80 and the frame 83 are forced to swing around the studs 82, against the tension of the spring 87. Since the drum 20 is tilting with the frame 17, the cooked food then falls out of the drum 20, which continues to rotate and so insure unloading of the food since there is no disengagement of the drum-rotating mechanism during tilting of the frame 17. A director chute 90, secured to the base 16, may be provided to guide the falling food toward the center of the tray 32.

Automatic tilting

My device also provides for automatic unloading after a timed cooking interval. Actually, the shaft threads 48 and the flanged follower collar 63 are provided for use in this automatic operation, since support of the frame 17 could be achieved by other types of contact between the rod 50 and the frame 17 if manual tilting only were to be used.

It will be evident that since the flange 64 engages the screw threads 48 and since the shaft 35 is rotating during cooking, the collar 63 will be slowly moved along the rod 50 toward the end 51. By use of a synchronous motor 21, chosen gear ratios, and a selected pitch for the thread 48, the movement of the collar 63 along the rod 50 may be determined at any desired rate, e.g., at one inch per minute.

As the collar 63 moves along the rod 50, it compresses a spring 91 against a collar 92, whose position along the rod 50 is adjustable and may be fixed at any desired position by a set screw 93. The spring pressure against the collar 92 builds up, and when it reaches a certain value the spring pressure moves the rod 50 to the left in Fig. 7. Eventually, this movement of the rod 50 brings the end 55 out beyond the edge of the catch 57, and then the frame 17 and rod 50 drop, just as described in the section on manual tilting. The disengagement of the flange 64 from the shaft 35 stops the compression of the spring 91, which then forces the collar 63 back down the tilted rod 50, while the spring 61 moves the rod 50 to the right (Fig. 8).

Once a position has been chosen for the collar 92, and the set screw 93 tightened, the timing may be adjusted by controlling the starting point of the follower collar 63. One way of doing this is to provide an adjustable stop 94 limiting the position to which the collar 63 is returned by the spring 91 when the rod 50 tilts. In the drawings (Fig. 2) a friction braked stop 94 is shown mounted for easy adjustment by sliding along a frame member 95 which may be calibrated to indicate the timing interval so provided, and this calibration may include ratchet-like raised portions or grooves 95ᵃ engaged by the friction brake.

To insure positive location of the collar 63 in its initial position at each time cycle and to prevent it from bouncing away from the stop 94, a magnet 96 may be secured to the stop 94, the collar 63 being made of ferromagnetic material.

The cooking drum 20

The interior of the drum 20 is of a special construction. It has a reflective corrugated cylindrical surface 100, and the corrugations are of such design that they serve two purposes. One is to turn the food over constantly as the drum 20 revolves, and the other, which is of major importance, is to act as an unusually efficient reflector of the heat rays being sent out by the heating unit. The hills and valleys of the corrugated surface are curved to provide concave cylindrical reflectors 101 (Fig. 6) whose focal lengths are determined to focus the heat that the reflectors reflect back from the heater unit 30 along lines only an inch or two above the crests of convex portions 102. This concentrates heat at or near the food being cooked. At the same time the convex portions 102 effectively disperse heat in such a manner that underneath portions of the food are properly cooked. About half the heat is diffused, while the other half is concentrated in a cylindrical zone 103. Thus a cooking zone 103 (Fig. 6) is set up in which the food is thoroughly and completely cooked. It will be noted that this zone 103 lies closer to the drum surface 100 than to the heater 30.

As Figs. 1 and 9 show, the loading end 25 of the drum 20 is provided with an annular lip 104 to keep food from falling out the end 25, while short blades 105 may direct the food in toward the center of the drum 20, to help the product move from the end 25 to the other end 26 during the cooking cycle. Preferably, there are also several rows (e.g., four) of short prongs 106, each row preferably being placed along the crest of a convex portion 102 of the corrugations. These prongs 106 serve to agitate the food product and to give improved air circulation.

The heating unit 30

The heating unit 30 comprises a set of electric heating tubes 110 (three are shown by way of example) supported in a semi-circular reflector 111 of novel structure. Preferably the tubes 110 are of the infra-red type (such as the G.E. Q1000), and they give off a great deal of heat.

I have found that when the full length of the tubes 110 was inside the reflector 111 and subject to re-reflecting from the convex corrugations 102 as well as reflection from the reflector 111, the concentration of heat on the end portions 112 of the tubes 110 was too great, and the tubes 110 broke down long prior to their normal life-expectancy. I have found that this difficult problem can be solved without reducing the total efficiency, by providing the reflector 111 with end plates 113 beyond which the tube ends 112 project and with deflectors 114 below the tube ends 112. Both the plates 113 and deflectors 114 may be made integral with the reflector 111, if desired. The end plates 113 shield the ends 112 of the tubes 110 from the heat inside the reflector 111, while the deflectors 114 shield them from the heat reflected up from the bottom corrugations 100. By protecting the ends 112 from breaking down, the tube life has been doubled, even though most of the tube 110 in between its ends is exposed to reflected heat.

The reflective surface 115 of the reflector 111 is preferably corrugated to provide cylindrical, mirror-like concave and convex elements or else provided with a multitude of tiny lensed mirrors to focus the heat rays and concentrate them in the area 103. The heat rays from the upper halves of the tubes 110, which are headed in various directions therefrom, hit the reflective surface 115 and are reflected down to and focused on the area 103 to provide intense heat there. If no food product stops the ray, it continues and is reflected back from the corrugations 100 of the drum 20 to heat the product from below. With the constant agitation of the product by the rotation of the corrugated drum 20, all parts of the product are cooked by this novel reflective heating system, and more quickly than heretofore, because the radiant energy is concentrated. The convex portions of the reflector surface 115 diffuse a portion of the heat over the bottom portion of the rotating drum 20.

Any food that might be carried into the upper part of the drum 20 by the prongs 106 or otherwise, would char and thus affect the taste of the other food if it dropped on the hot tube ends 112. Therefore, a screen mesh guard 116 covers the exposed end of the tubes, both over them and at the vertical ends, so that food being put in through the hopper 24 also will not strike the ends 112. Since the reflector 111 is convex on top, food will roll off it if any falls there.

The wiring of the tubes 110 is shown in Fig. 5 and Fig. 2. Wires 117 run from the tube ends 112 into the hollow supporting bracket 31 and from there via a conduit 118 to a mercury switch 119 mounted on the frame 17. The mercury switch 119 is operated by the tilting of the frame 17; it turns on the electricity to the heating unit 30 when the drum 20 and frame 17 are level, and turns off the current when the drum and frame are tilted.

A switch 120, which starts the motor 21, is located on the side of the base 16. This switch 120 should always be turned on before raising the drum 20 into its level position where the heating unit 30 will be turned on by the mercury switch 119, to insure rotation of the drum 20 during cooking. This switch 120 may be left on at all times when the restaurant is opened, since the motor does not use much current, especially in comparison with the heater tubes 110.

One more factor enters into the cooking. The reflector 111 may be made much more efficient by providing it with a surface 115 that is highly reflective to infrared (heat) rays. Reflectivity of the visible sprectrum is no indication of infra-red reflectivity. I have found, for instance, that a light gold anodized aluminum is much more effective for browning French fried potatoes than is plain aluminum having higher reflectivity to the visible spectrum. The reflector appears to act as a filter, accentuating certain wave lengths (heat frequencies) with respect to others (light frequencies).

The warming tray 32

A switch 121, below the motor switch 120, turns on and off a warming lamp 122 housed in a reflector 123 (Fig. 3), which keeps the food 124 in the tray 32 warm. Any suitable type of tray 32 may be used, though the removable one illustrated is at present preferable. The reflector 123 should spread the heat evenly over the tray 32 instead of concentrating it, and its focal length is determined accordingly. Its color also differs from that of the reflector 111, so as to get warmth but reduce drying out by choosing selected frequencies. The tray 32 may be enclosed by glass on three sides to give display without loss of warmth.

Operation

In order to give a complete picture of how the device works, I will now describe the complete operation of my device, using, as an example only, the cooking of French fried potatoes 124. The potatoes may be partially (e.g. 30% to 80%) cooked or blanched in deep fat so that they have grease in or on them, and they may then be frozen in order to make storage, shipment, and handling easier. When they are to be served, the frozen potatoes 124 are poured through the hopper 24 into the drum 20.

The motor switch 120 will already have been turned on to start the motor 21, which drives the shaft 35 and the gears 36, 38 and 40 to rotate the drum 20. Just before the potatoes are put in, the drum 20 is raised to its level position by lifting the handle 60; then the mercury switch 119 automatically turns on the electricity to the heat tubes 110 which then begin radiating heat rays. These heat rays are reflected from the reflector 110 and concentrated in the cooking zone 103. Moreover, the corrugations 100 reflect the heat back up to the heating zone 103 to aid in intensifying the heat there.

The potatoes are then put in the opening 25, and the blades 105 help move the potatoes 124 away from the lip 104 into the drum 20, where the prongs 106 and the corrugations 100 agitate the potatoes sufficiently to give proper air circulation. The potatoes 124 tumble about in the drum 20. This means that rather than cooking the potatoes only where they touch the drum 20 or only where the potatoes are closest to the suspended heating elements 110, the potatoes 124 are being cooked uniformly, both top and bottom.

The period of cooking is determined mainly by the kind of food and the amount in volume to be cooked, and the timer stops 94 and the collar 92 are properly spaced beforehand to give the desired time. The movable timer collar 63, which at the beginning of a cycle is held against the time stop 94 by a small magnet 96, is moved slowly during rotation of the drum 20 by the threaded shaft 35, and soon the collar 63 begins to compress the spring 91. At the desired time the spring 91 forces the frame support rod 50 to the left (Figs. 2 and 7) and pulls the end 55 of the rod 50 out of the catch 57, so that the frame 17 and the drum 20 tilt, and the gate 27 is opened by engagement of the trip lever 88 with the cam 89. Meanwhile, the current to the heating elements 110 is cut off by the tilting of the mercury switch 119 to increase efficiency by eliminating waste of electricity, and the collar flange 64 is disengaged from the threads 48 and forced by the spring 91 against the timer stop 94, where it is held by the magnet 95 until the next cycle begins.

The potatoes 124 fall out while the drum 20 continues to rotate, and are guided by the director chute 90 into the receiving tray 32. The potatoes 124 may then be salted and served. If not served immediately, they are kept warm by the warming lamp 122 and its reflector 123.

This method of cooking the potatoes provides a practically greaseless French fried potato, because the grease is cooked off them in the drum 20 and no additional grease is applied. About 95% of the grease on the precooked potatoes may be removed in this manner. This is important from many standpoints, and is a tremendous sales point with calorie counters.

While the foregoing operation has mentioned French fried potatoes as an example of the product, the invention is equally effective with other foods, such as baking or frying shrimp, baking whole potatoes or slices, cooking chicken and hot dogs, etc.

When the hood 22 is removed, the drum 20 may easily be removed from the frame 17 for cleaning, first removing the gate 27, by springing the arms 84 and 85 off the studs 82. Then the drum 20 is lifted off the gears 38 and 42 and the supporting rollers 44 and 45 and retracted from the gate end of the frame 17. This also gives easy access to the driving mechanism and other parts supported by the frame 17.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cooking device, including in combination, a cylindrical cooking drum having a corrugated cylindrical surface providing alternating concave and convex reflecting surfaces for redirecting heat which is directed thereat; means for rotating said drum; infrared emitting radiant heating tubes supported inside said drum; and an arcuate reflector for said heating tubes having a corrugated surface with alternating concave and convex reflecting surfaces for focusing the heat from said heating tubes at a point between a segment of said drum surface and said heating tubes, said reflector having closed end members through which the outer ends of said tubes project, said outer ends containing electrical connections therefor, so as to shield said connections from the concentrated heat in said reflector and thereby lengthen the life of said tubes.

2. The apparatus of claim 1 wherein perforate shielding means cover and are spaced from the upper side and ends of said tubes, to permit ventilation thereof while deflecting food particles therefrom to prevent them from charring.

3. A cooking device, including in combination, a cylindrical cooking drum having an inner heat-reflecting surface; means for rotating said drum; radiant heating tubes supported inside said drum; and an arcuate reflector for said heating tubes for focusing the heat from said heating tubes, said reflector having closed end members through which the outer ends of said tubes project, said outer ends containing electrical connections therefor, so as to shield said connections from the concentrated heat in said reflector and thereby lengthen the life of said tubes.

4. A cooking device, including in combination, a supporting base; a tiltable frame pivotally supported on the base for movement between a normally horizontal position and a tilted position; means for supporting said frame in its normally horizontal position; release means for moving said frame to its tilted position; stop means for determining its tilted position at a particular tilt; a cooking drum rotatably mounted on said frame, said drum having an annular lip at one end with longitudinally extending fins there-adjacent to keep food from falling out said one end and moving it toward the other end, and gate means at the other end, opened upon tilting of said frame; means for rotating said drum relatively to said frame; and heating means positioned inside said drum.

5. The apparatus of claim 4 wherein said gate comprises a gate frame member pivotally mounted to said frame and a semicircular closure disc supported adjacent the lower half of said drum by said gate frame member, leaving the upper half open for ventilation, a cam mounted on said base, a trip member mounted on said gate frame member for engaging said cam upon tilting of said frame to open said gate, and spring means normally urging said gate to its closed position.

6. A cooking device, including in combination, a supporting base; a tiltable frame pivotally supported on the base for movement between a normaly horizontal position and a tilted position; means for supporting said frame in its normally horizontal position; release means for moving said frame to its tilted position; stop means for determining its tilted position at a particular tilt; a cooking drum rotatably mounted on said frame and tiltable therewith, the end of the drum which is lower when said drum is tilted having a gate and means for opening said gate when said drum tilts and for closing said gate when said drum is horizontal, said gate comprising a gate frame member pivotally mounted to said frame and a semicircular closure disc supported adjacent the lower half of said drum by said gate frame member, leaving the upper half open for ventilation, a cam mounted on said base, a trip member mounted on said gate frame member for engaging said cam upon tilting of said frame to open said gate, and spring means normaly urging said gate to its closed position; means for rotating said drum relatively to said frame; and heating means positioned inside said drum.

7. A cooking device, including in combination, a supporting base; a tiltable frame pivotally supported on the base for movement between a normally horizontal position and a tilted position; means for supporting said frame in its normally horizontal position; release means for moving said frame to its tilted position; stop means for determining its tilted position at a particular tilt; a cooking drum rotatably mounted on said frame, said drum having a corrugated surface with crests and valleys and a plurality of rows of prongs projecting therethrough along the crests for agitating food that is rotated therein and giving improved air circulation; means for rotating said drum relatively to said frame; and heating means positioned inside said drum.

8. The apparatus of claim 1 wherein said reflector also has heat-ray deflecting flanges extending out from said ends below said tube to shield said tubes from the heat reflected back from the corrugated surface of the drum.

9. The apparatus of claim 1 wherein wire mesh means cover and are spaced from the upper side and ends of said tubes, to permit ventilation thereof while deflecting food particles therefrom to prevent them from charring.

10. A cooking device, including in combination, a supporting frame; a rotatably mounted cooking drum supported by said frame and having a corrugated cylindrical surface providing alternating concave and convex reflecting surfaces for re-directing heat which is directed thereat; means for rotating said drum; radiant heating means supported by said frame inside said drum; and an arcuate reflector for said heating means having a corrugated surface with alternating concave and convex reflecting surfaces smaller than those on said drum for focusing the heat from said heating means at a zone lying between a segment of said drum surface and said heating means and closer to said drum surface.

11. A cooking device, including in combination, a supporting frame; a rotatably mounted cooking drum supported by said frame and having a cylindrical interior surface of high heat reflectivity providing alternating concave and convex reflecting surfaces for focusing approximately half the heat which is directed thereat along a cylindrical zone spaced closely above said surface and diffusing the remainder of said heat; means for rotating said drum; radiant heating means supported by said frame inside said drum; and an arcuate reflector for said heating means having a surface of high infrared reflectivity with alternating concave and convex reflecting surfaces smaller than those on said drum for focusing much of the heat from said heating means at said cooking zone and diffusing the remainder.

12. A cooking device, including in combination, a supporting base; a tiltable frame pivotally supported on the base for movement between a normally horizontal position and a tilted position; a cooking drum rotatably mounted on said frame; means for rotating said drum relatively to said frame, said means for rotating comprising an electric motor and a drive shaft driven by said motor and in driving engagement with said drum; means for supporting said frame in its normally horizontal position, said means for supporting comprising a rod supported adjacent one end of said frame for longitudinal movement with respect thereto, means on said rod in engagement with another portion of said frame, so as to support it, and a bracket on said base adapted to releasably support a free end of said rod; release means for moving said rod off said bracket; stop means for determining the stopping point of said frame at a particular tilt; and heating means positioned inside said drum.

13. A cooking device, including in combination, a supporting base; a tiltable frame pivotally supported on the base for movement between a normally horizontal position and a tilted position; a cooking drum rotatably mounted on said frame; rotating means for said drum, said rotating means comprising an electric motor and a threaded drive shaft driven by said motor and in driving engagement with said drum; support means for said frame in its normally horizontal position, said support means comprising a rod supported by said frame generally parallel to said drive shaft for longitudinal movement with respect to said frame, a collar on said rod having a sharp flange in engagement with the threads on said drive shaft, and a bracket on said base adapted to releasably support one end of said rod in a latched position; release means for moving said rod off said bracket; stop means for determining stopping said frame at a particular tilt; and heating means positioned inside said drum.

14. The apparatus of claim 13 wherein said rod is provided with spring means yieldably urging said rod longitudinally toward its latched position.

15. The apparatus of claim 13 for automatically timing the cooking, wherein said rod has spring means compressed by said collar upon movement therealong by said threaded drive shaft for release of said rod at a predetermined time.

16. The apparatus of claim 15 wherein said rod is mounted for lateral motion near one end of said frame for disengagement of said flange from the threads of the drive shaft upon tilting of said frame relative to said base.

17. The apparatus of claim 16 wherein timing is completed by stop means determining the initial position of the flanged collar when said frame is restored from its tilted position to its normally horizontal position.

18. The apparatus of claim 17 wherein said flanged collar is ferromagnetic and said stop means has a magnet thereon.

19. A food cooker and warmer including in combination a normally level tiltable drum having a receiving end and a removal end, said drum having a corrugated interior surface, a heating element suspended in said drum, a reflector behind said element to focus the heat waves in a cooking zone, automatic timing and dumping means connected to said drum for lowering one end of said drum after a predetermined cooking time, a receiving tray positioned below said drum to receive the contents thereof upon dumping, and a second heating element with reflector positioned above said receiving tray, to keep the food warm until served.

20. A food cooker and warmer including in combination a normally level tiltable drum having a receiving end and a removal end, said drum having a corrugated interior surface, a heating element suspended in said drum, a reflector behind said element to focus the heat waves in a cooking zone, and automatic timing and dumping means for tilting said drum to lower said removal end upon the completion of a preselected time interval.

References Cited in the file of this patent

UNITED STATES PATENTS

| | | |
|---|---|---|
| 339,433 | Lalley | Apr. 6, 1886 |
| 1,122,651 | Shortt | Dec. 29, 1914 |
| 1,812,016 | Nieloud | June 30, 1931 |
| 2,253,047 | Purkett | Aug. 19, 1941 |
| 2,643,463 | Grantham | June 30, 1953 |
| 2,677,195 | Menning | May 4, 1954 |

FOREIGN PATENTS

| | | |
|---|---|---|
| 349,741 | Great Britain | June 4, 1931 |